(12) United States Patent
Whittle et al.

(10) Patent No.: US 10,934,862 B2
(45) Date of Patent: Mar. 2, 2021

(54) TURBINE WHEEL ASSEMBLY

(71) Applicants: Rolls-Royce plc, London (GB);
Rolls-Royce North American Technologies Inc., Indianapolis, IN (US)

(72) Inventors: Michael J. Whittle, Derby (GB);
Alexander Wong, Derby (GB);
Anthony Razzell, Derbyshire (GB);
Ted J. Freeman, Danville, IN (US)

(73) Assignees: Rolls-Royce plc; Rolls-Royce North American Technologies Inc., Indianapolis, IN (US)

( * ) Notice: Subject to any disclaimer, the term of this patent is extended or adjusted under 35 U.S.C. 154(b) by 262 days.

(21) Appl. No.: 16/109,237

(22) Filed: Aug. 22, 2018

(65) Prior Publication Data
US 2020/0063577 A1   Feb. 27, 2020

(51) Int. Cl.
*F01D 5/30*   (2006.01)

(52) U.S. Cl.
CPC ......... *F01D 5/3084* (2013.01); *F01D 5/3015* (2013.01); *F01D 5/3038* (2013.01); *F01D 5/3046* (2013.01); *F01D 5/3069* (2013.01); *F01D 5/3092* (2013.01); *F05D 2230/237* (2013.01); *F05D 2260/33* (2013.01); *F05D 2260/941* (2013.01); *F05D 2260/95* (2013.01); *F05D 2300/6033* (2013.01)

(58) Field of Classification Search
CPC ...... F01D 5/303; F01D 5/3038; F01D 5/3046; F01D 5/3069; F01D 5/3084; F01D 5/3076; F01D 5/284; F01D 5/3023; F01D 5/3092; F01D 5/3053

USPC ................. 416/214 R, 214 A, 215, 216, 217
See application file for complete search history.

(56) References Cited

U.S. PATENT DOCUMENTS

| | | | | |
|---|---|---|---|---|
| 811,985 A * | 2/1906 | Wilkinson | ............ | F01D 5/3046 416/222 |
| 819,105 A * | 5/1906 | Wilkinson | ............ | F01D 5/3053 416/217 |
| 819,106 A * | 5/1906 | Wilkinson | ............ | F01D 5/3023 416/217 |
| 839,242 A * | 12/1906 | Wilkinson | ............ | F01D 5/3046 416/222 |
| 876,971 A * | 1/1908 | Junggren | ............ | F01D 5/3038 416/215 |
| 1,318,091 A | 10/1919 | Ljungstrom | | |
| 1,325,208 A * | 12/1919 | Rice | ............ | F01D 5/3038 416/215 |
| 1,366,119 A * | 1/1921 | Darling | ............ | F01D 5/3069 416/215 |
| 2,319,846 A * | 5/1943 | Carlson | ............ | F01D 5/3069 416/201 R |
| 2,484,274 A * | 10/1949 | Eastman | ............ | F01D 5/3069 416/216 |

(Continued)

FOREIGN PATENT DOCUMENTS

| | | | | |
|---|---|---|---|---|
| DE | 102008036197 A1 * | 2/2010 | ............ | F01D 5/3069 |
| JP | 59203809 A * | 11/1984 | ............ | F01D 5/3069 |

*Primary Examiner* — Michael Lebentritt
*Assistant Examiner* — Topaz L. Elliott
(74) *Attorney, Agent, or Firm* — Barnes & Thornburg LLP

(57) ABSTRACT

The present disclosure is related to turbine wheel assemblies for gas turbine engines. Such turbine wheel assemblies may include ceramic matrix composite airfoil components mounted with different types of coupling to a central disc.

17 Claims, 6 Drawing Sheets

(56) References Cited

U.S. PATENT DOCUMENTS

| | | | | |
|---|---|---|---|---|
| 2,631,004 A | * | 3/1953 | Swansen | F01D 5/021 416/217 |
| 2,641,440 A | * | 6/1953 | Williams | F01D 5/187 416/90 R |
| 2,985,426 A | * | 5/1961 | Hunter | F01D 5/06 416/97 R |
| 3,055,633 A | * | 9/1962 | Pouit | F01D 5/08 416/90 R |
| 4,051,585 A | * | 10/1977 | Walker | B23P 15/006 29/889.21 |
| 4,344,740 A | * | 8/1982 | Trenschel | F01D 5/3015 416/193 A |
| 4,509,900 A | | 4/1985 | Odawara | |
| 4,573,875 A | | 3/1986 | Emeterio et al. | |
| 5,405,244 A | * | 4/1995 | Boyd | F01D 5/3069 416/214 A |
| 5,431,541 A | * | 7/1995 | Shaffer | F01D 5/3069 416/205 |
| 5,743,713 A | * | 4/1998 | Hattori | F01D 5/14 416/215 |
| 6,974,508 B1 | * | 12/2005 | Gabb | C22C 1/0433 148/428 |
| 8,651,820 B2 | | 2/2014 | Krikunov et al. | |
| 9,903,212 B2 | | 2/2018 | James | |
| 9,938,838 B2 | | 4/2018 | Witz et al. | |
| 10,539,022 B2 | * | 1/2020 | Choi | F01D 5/3046 |
| 2009/0200268 A1 | | 8/2009 | Tappan et al. | |
| 2014/0030076 A1 | * | 1/2014 | Nunez | F01D 5/282 415/183 |
| 2015/0010404 A1 | * | 1/2015 | Le Hong | F04D 29/26 416/220 R |
| 2016/0047257 A1 | | 2/2016 | Radomski et al. | |
| 2016/0186569 A1 | * | 6/2016 | Choi | F01D 5/005 416/214 A |
| 2016/0376920 A1 | * | 12/2016 | Luczak | F01D 5/3015 416/1 |
| 2017/0291265 A1 | * | 10/2017 | Bochiechio | B23K 35/3033 |

\* cited by examiner

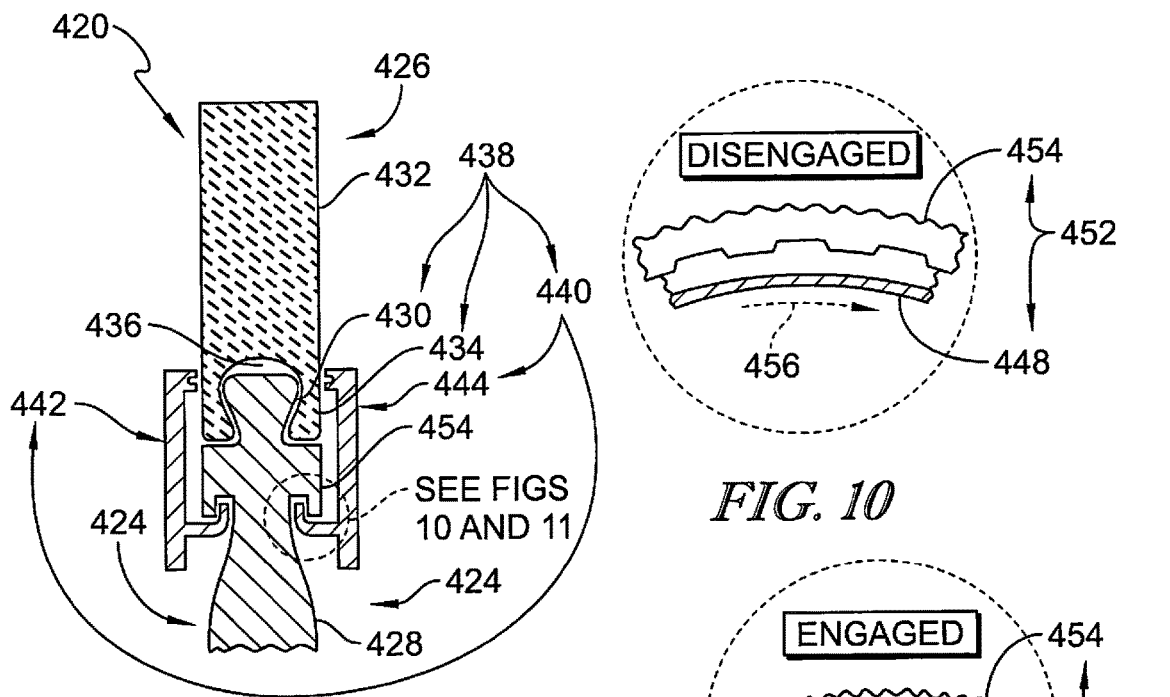
FIG. 9
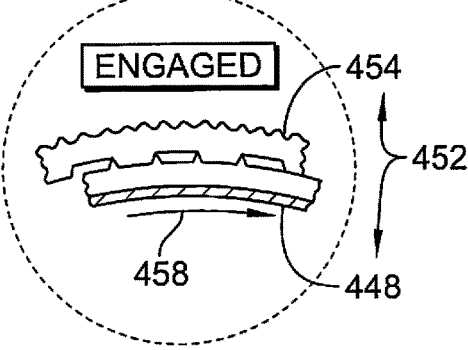
FIG. 10
FIG. 11
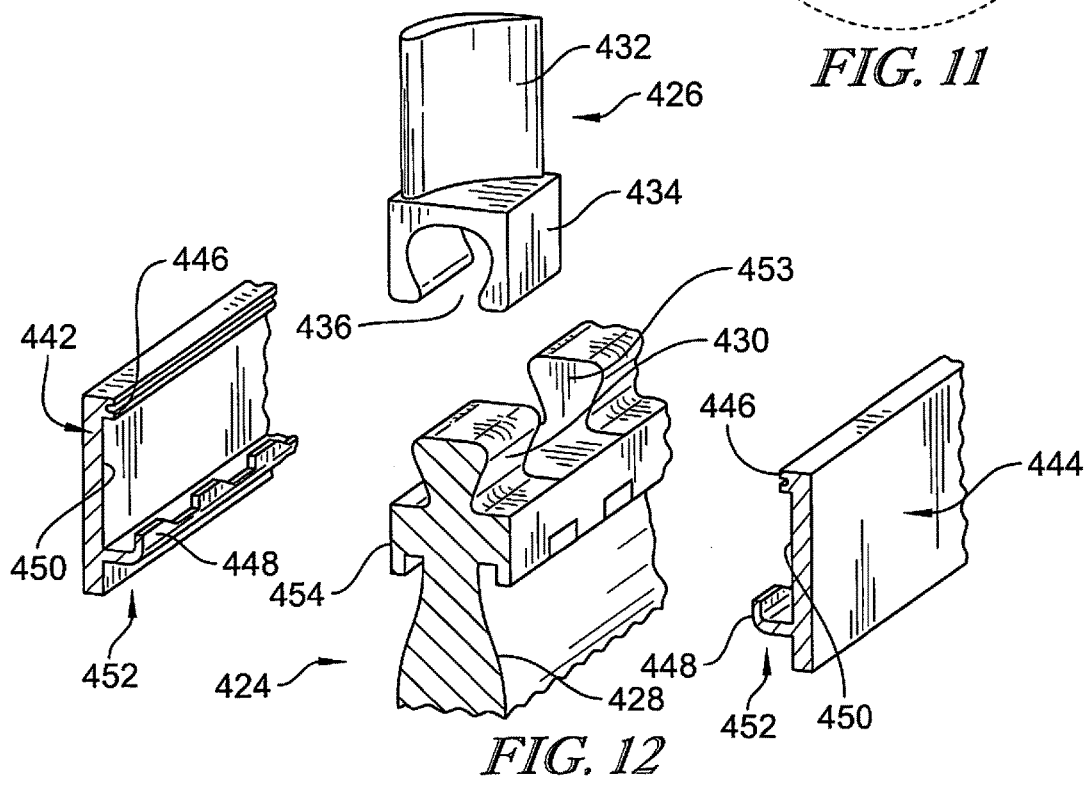
FIG. 12

TURBINE WHEEL ASSEMBLY

FIELD OF THE DISCLOSURE

The present disclosure relates generally to gas turbine engines, and more specifically, to turbine wheel assemblies used in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include discs carrying blades around their outer edges. Some rotating wheel assemblies can include ceramic-containing components. Ceramic-containing components can be designed to withstand very high temperatures while also being lightweight. In view of the potential benefits of including ceramic-containing materials in rotating wheel assemblies, there is a need for further design development in this area.

SUMMARY

The present disclosure may comprise one or more of the following features and combinations thereof.

A turbine wheel assembly for use in a gas turbine engine may include a disc and a turbine blade. The disc comprises metallic materials and is arranged around a central axis. The turbine blade comprises ceramic matrix composite components.

In some embodiments, the disc includes a central hub and a dovetail rim. The dovetail rim extends most of the way around an outer diameter of the central hub about the central axis. The turbine blade is shaped to include an airfoil and a root. The root is configured to engage with the dovetail rim of the disc.

In some embodiments, the dovetail rim forms a dovetail cross-sectional shape when viewed in the circumferential direction looking around the central axis. The root of the turbine blade defines a dovetail-receiver channel which extends circumferentially through the root. The dovetail-receiver channel receives the dovetail rim such that the dovetail rim of the disc and the root of the turbine blade provide a blade mount that couples the turbine blade to the disc.

In some embodiments, the blade mount further includes a clamp assembly. The clamp assembly is configured to apply axial clamp load onto the root of the turbine blade.

In some embodiments, the clamp assembly includes a forward keeper ring, an aft keeper ring, and a fastener. The forward keeper ring is arranged along an axially forward side of the disc. The aft keeper ring is arranged along an axially aft side of the disc. Each of the forward and aft keeper rings are shaped to provide a root interface portion and a disc interface portion. The root interface portion is configured to engage and apply axial clamp load onto the root of the turbine blade. The disc interface portion is configured to engage and apply axial clamp load onto the disc.

In some embodiments, the forward and aft keeper rings are further shaped to include a radially parallel portion. The radially parallel portion extends between and interconnects the root interface portion and the disc interface portion. The radially parallel portion is located radially inward and under the root of the turbine blade.

In some embodiments, the clamp assembly further includes a fastener. The fastener is configured to couple the disc interface portion of the forward and aft keeper rings to the disc.

In some embodiments, the fastener extends through the disc interface portions of the forward and aft keeper rings and the disc to couple the disc interface portions of the forward and aft keeper rings to the disc so that the disc interface portions apply axially clamp load to the disc.

These and other features of the present disclosure will become more apparent from the following description of the illustrative embodiments.

BRIEF DESCRIPTION OF THE DRAWINGS

FIG. 9 is a cross-sectional detail view of a fourth turbine wheel assembly showing that the turbine wheel assembly includes a dovetail rim t of the clamp assembly when the bayonet feature is engaged with the disc;

FIG. 10 is a detail view of the turbine wheel assembly of FIG. 9 showing an interface of the disc and the clamp assembly with the clamp assembly disengaged;

FIG. 11 is a detail view of the turbine wheel assembly of FIG. 9 showing an interface of the disc and the clamp assembly with the clamp assembly engaged;

FIG. 12 is an exploded perspective view of the turbine wheel assembly of FIG. 9 showing that the dovetail rim of the disc and the root of the turbine blade are retained together by a clamp assembly, the clamp assembly including forward and aft keeper rings with bayonet features;

DETAILED DESCRIPTION

Figure 1:
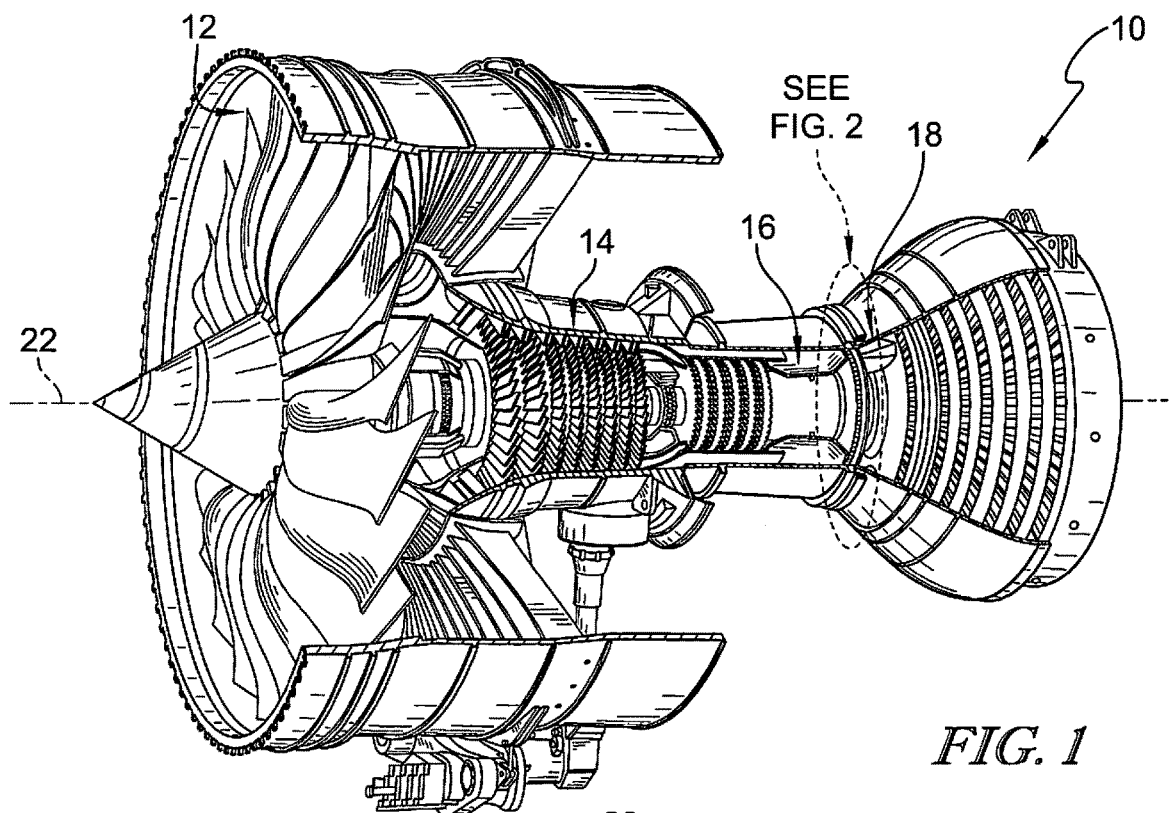
FIG. 1 is a perspective view of a gas turbine engine with a portion of the engine cut away to show, from left to right, a turbofan, a compressor section, a combustor, and a turbine section included in the engine.

For the purposes of promoting an understanding of the principles of the disclosure, reference will now be made to a number of illustrative embodiments illustrated in the drawings and specific language will be used to describe the same.

An exemplary gas turbine engine 10 according to the present disclosure is shown in FIG. 1. The engine 10 includes a turbofan 12, a compressor section 14, a combustor 16, and a turbine section 18. The fan 12 rotates to provide thrust to an associated aircraft. The compressor section 14 draws in air and compresses it increasing pressure of the air before delivering it to the combustor 16. In the combustor 16, fuel is mixed with the pressurized air from the compressor section and is ignited to create hot high-pressure combustion products. The combustion products move out of the combustor and into the turbine section 18 where they interact with the turbine section creating rotation of some turbine section 18 components that, in turn, drive rotation of the fan 12 as well as some components of the compressor section 14.

Figure 2:
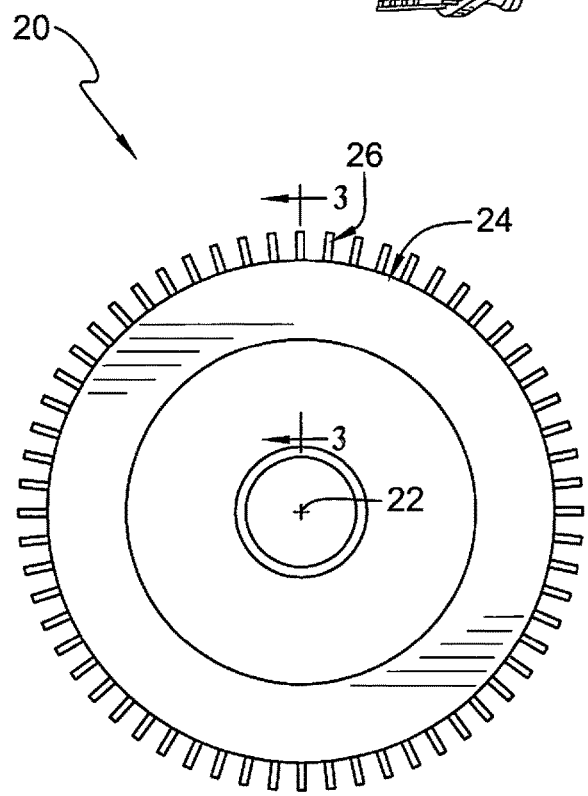
FIG. 2 is an elevation view of a turbine wheel assembly used in the turbine section of the engine of FIG. 1 showing that the turbine wheel assembly includes a disc and turbine blades mounted around the outer diameter of the disc.
Figure 3:
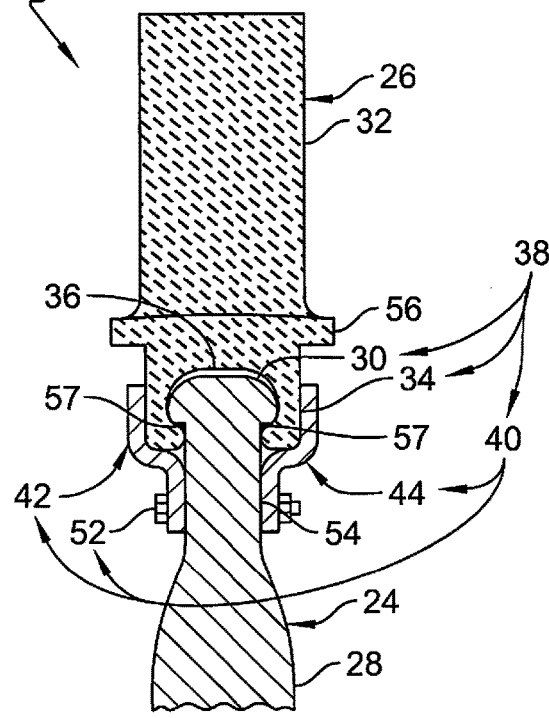
FIG. 3 is a cross-sectional detail view of the turbine wheel assembly of FIG. 2 taken at line 3-3 showing that the turbine wheel assembly includes a dovetail rim included in the disc and a root included in the turbine blade and configured to receive the dovetail rim of the disc.
Figure 4:
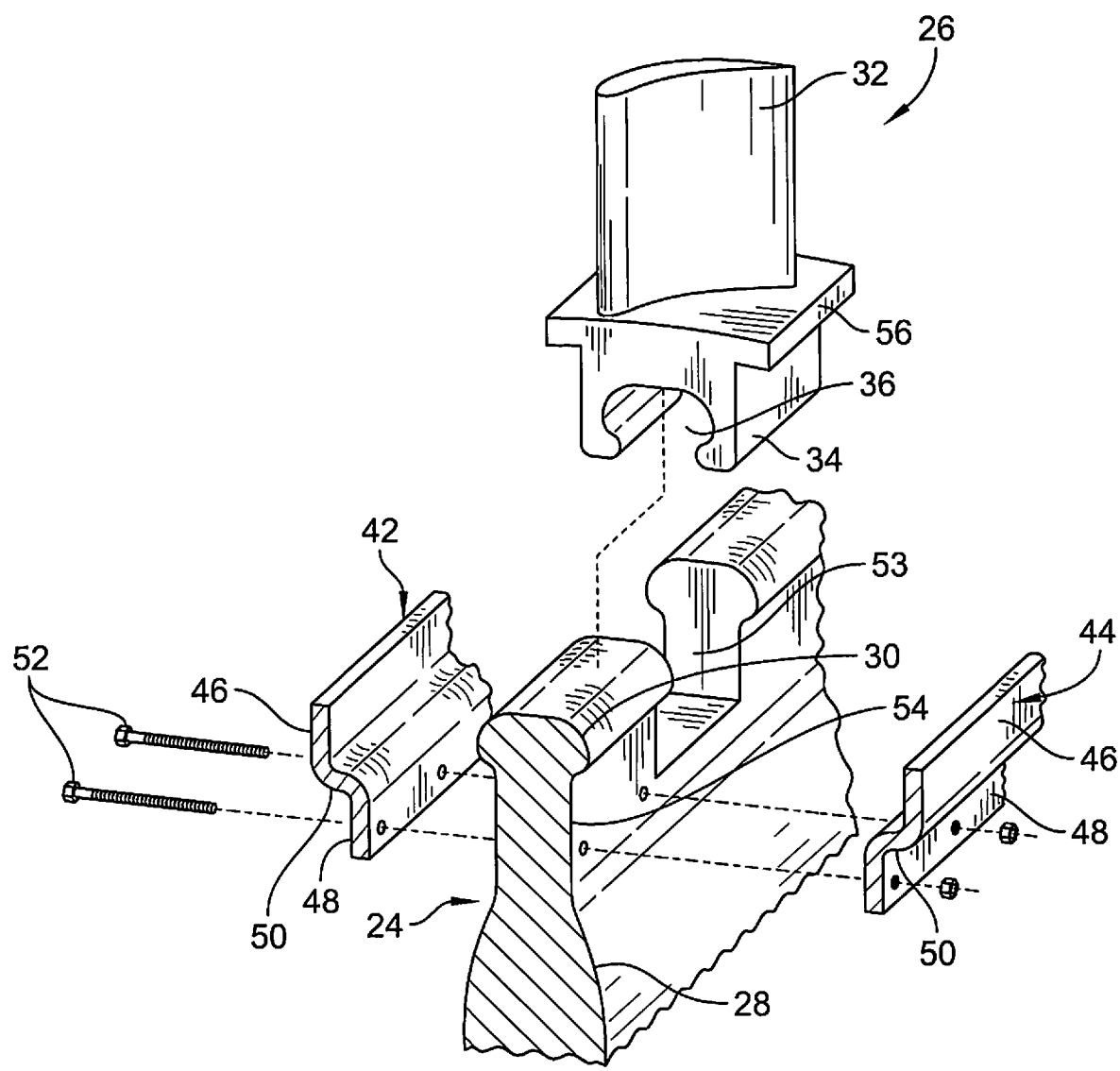
FIG. 4 is an exploded perspective view of the turbine wheel assembly of FIG. 3 showing that dovetail rim of the disc and the root of the turbine blade are retained together by a clamp assembly, the clamp assembly including forward and aft keeper rings and a fastener.

A first turbine wheel assembly 20 adapted to be included in the turbine section 18 of the engine 10 is shown in FIGS. 2-4. The turbine wheel assembly 20 is designed to rotate about a central axis 22, upon interaction with expanding combustion products from the combustor 16. The turbine wheel assembly 20 includes a disc 24 and a turbine blade 26. The disc 24 is made of metallic materials and is arranged around the central axis 22. The turbine blade 26 is made of ceramic matrix composite materials.

The disc 24 includes a central hub 28 and a dovetail rim 30 as shown in FIGS. 3 and 4. The dovetail rim 30 extends most of the way around an outer diameter of the central hub 28 about the central axis 22.

The turbine blade 26 is shaped to include an airfoil 32 and a root 34 as shown in FIGS. 3 and 4. The airfoil 32 is aerodynamically shaped to interact with expanding gas in combustion products to drive rotation of the turbine wheel assembly 20. The root 34 is configured to engage with the dovetail rim 30 of the disc 24.

The dovetail rim 30 forms a dovetail cross-sectional shape when viewed in the circumferential direction looking around the central axis 22. The root 34 of the airfoil 32 defines a dovetail-receiver channel 36 extending circumferentially through the root 34. The dovetail-receiver channel 36 receives the dovetail rim 30 such that the dovetail rim 30 of the disc 24 and the root 34 of the turbine blade 26 provide a blade mount 38 that couples the turbine blade 26 to the disc 24.

The blade mount 38 further includes a clamp assembly 40 as shown in FIGS. 3 and 4. The clamp assembly 40 is configured to apply axial clamp load onto the root 34 of the turbine blade 26.

The clamp assembly 40 includes a forward keeper ring 42 and an aft keeper ring 44 as shown in FIGS. 3 and 4. The forward keeper ring 42 is located on a forward side of the disc 24 and the aft keeper ring located an aft side of the disc 24. Each of the forward and aft keeper rings 42, 44 are shaped to provide a root interface portion 46 and a disc interface portion 48 as shown in FIGS. 3 and 4. The root interface portion 46 is configured to engage and apply axial clamp load onto the root 34 of the turbine blade 26. The disc interface portion 48 is configured to engage and apply axially clamp load onto the disc 24.

In the illustrative embodiment, each of the forward and aft keeper rings 42, 44 include a radially flat portion 50 as shown in FIGS. 3 and 4. The radially flat portion 50 extends between and interconnects the root interface portion 46 and the disc interface portion 48. The radially flat portion 50 is located radially-inward and under the root 34 of the turbine blade 26.

In the illustrative embodiment, the disc interface portion 48 of the forward and aft keeper rings 42, 44 is spaced axially inward from the root interface portion 46 of the forward and aft keeper rings 42, 44.

The clamp assembly 40 further includes a fastener 52. The fastener 52 is configured to couple the disc interface portions 48 of the forward and aft keeper rings 42, 44 to the disc 24. In some embodiments, the fastener could be bolts or any other acceptable fastener.

In the illustrative embodiment, the fastener 52 extends through the disc interface portions 48 of the forward and aft keeper rings 42, 44 and the disc 24 to couple the disc interface portions 48 of the forward and aft keeper rings 42, 44 to the disc 24 so that the disc interface portions 48 apply axially clamp load to the disc.

In the illustrative embodiment, the disc 24 further includes a gap 53 as shown in FIG. 4. The gap 53 extends partway around an outer diameter of the central hub 28 about the central axis 22. The gap 53 is configured to allow the root 34 of the turbine blade 26 to be loaded onto the dovetail rim 30 of the disc 24 to provide the blade mount 38. In some embodiments, the disc 24 will include more than one gap 53 spaced equally around the circumference of the disc 24 about the central axis 22. The equal spacing of the gaps 53 around the circumference of the disc 24 encourages balancing of the disc 24 when the turbine wheel assembly 20 rotates about the central axis 22.

In the illustrative embodiment, the disc 24 further includes a web section 54 as shown in FIGS. 3 and 4. The web section 54 is arranged to extend between and interconnect the dovetail rim 30 and the central hub 28. The disc interface portions 48 of each of the forward and aft keeper rings 42, 44 are configured to apply a clamp load onto the web section 54 of the disc 24 through the fastener 52.

In the illustrative embodiment, the turbine blade 26 further includes a platform 56 as shown in FIGS. 3 and 4. The platform 56 may be formed integrally with the airfoil 32. The platform 56 extends circumferentially from the airfoil 32 to block hot gasses interacting with a radially outer portion of the airfoil 32 from moving radially-inward toward the disc 24.

In some embodiments, the platform 56 may be an off-loaded platform. In other embodiments, the forward keeper ring 42 could be shaped to include a forward platform portion while the aft keeper ring 44 could be shaped to include an aft platform portion. The forward and aft platform portions extend circumferentially from the forward and aft keeper rings 42, 44 to block hot gasses interacting with a radially outer portion of the turbine blade 26 from moving radially-inward toward the disc 24.

In some embodiments, the blade mount 38 further includes an isolation layer 57. The isolation layer 57 is located at the interface of the root 34 and the dovetail rim 30. The isolation layer 57 is configured to resist chemical interaction between the ceramic matrix composite materials of the turbine blade 26 and the metallic materials of the disc 24.

In some embodiments, the isolation layer 57 has a compliance greater than the root 34 of the turbine blade 26 and the dovetail rim 30 of the disc 24 so as to provide a compliant layer there between. The compliant layer is configured to compress and spread contact loads between the root 34 and the dovetail rim 30 when the root 34 engages with the dovetail rim 30 of the disc 24. The spreading of the contact loads between the root 34 and the dovetail rim 30 avoids point contacts and associated stress concentrations in the blade mount 38.

Figure 5:
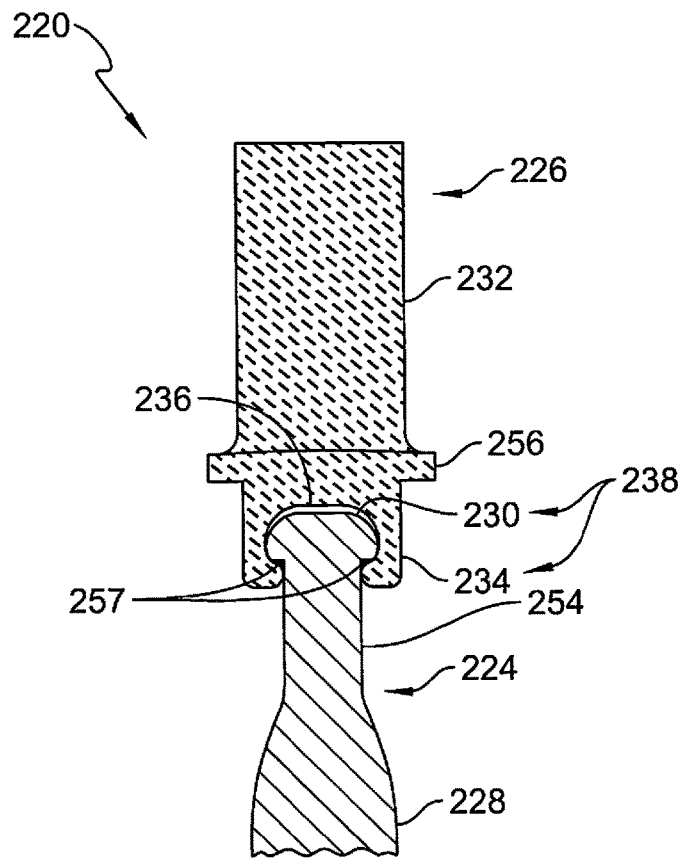
FIG. 5 is a cross-sectional detail view of a second turbine wheel assembly showing that the turbine wheel assembly includes a dovetail rim included in the disc and a root included in the turbine blade and configured to receive the dovetail rim of the disc.
Figure 6:
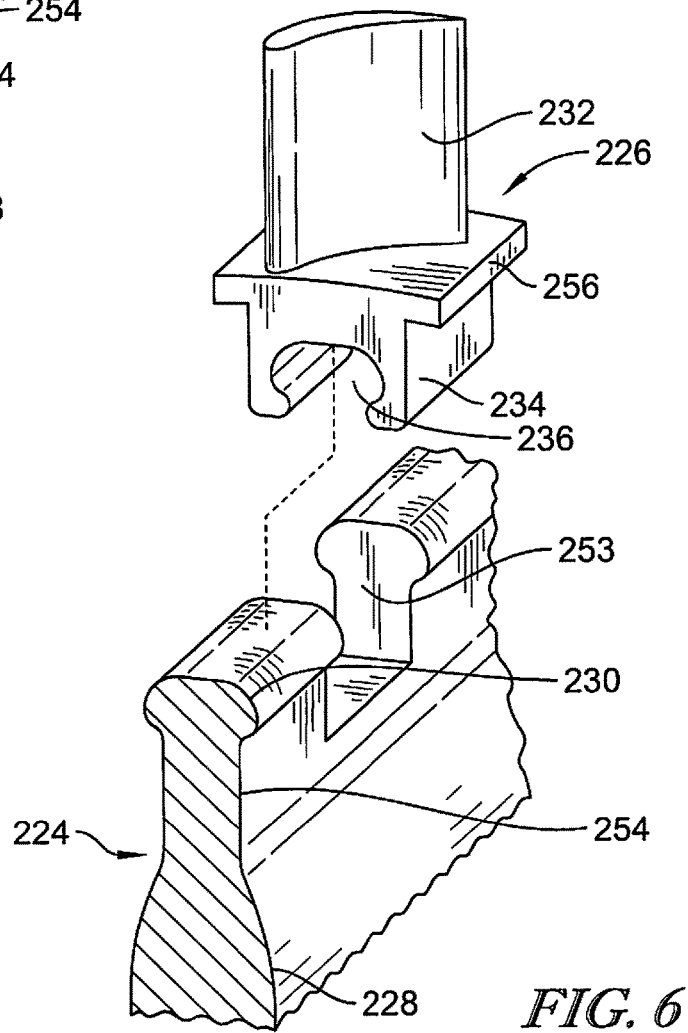
FIG. 6 is an exploded perspective view of the turbine wheel assembly of FIG. 5.

A second turbine wheel assembly 220 is shown in FIGS. 5 and 6 and is similar to the turbine wheel assembly 20 shown and described in FIGS. 3 and 4. The turbine wheel assembly 220 is designed to rotate about a central axis 22, upon interaction with expanding combustion products from the combustor 16. The turbine wheel assembly 220 includes a disc 224 and a turbine blade 226. The disc 224 is made of metallic materials and is arranged around the central axis 22. The turbine blade 226 is made of ceramic matrix composite materials.

The disc 224 includes a central hub 228 and a dovetail rim 230 as shown in FIGS. 5 and 6. The dovetail rim 230 extends most of the way around an outer diameter of the central hub 228 about the central axis 22.

The turbine blade 226 is shaped to include an airfoil 232 and a root 234 as shown in FIGS. 5 and 6. The airfoil 232 is aerodynamically shaped to interact with expanding gas in combustion products to drive rotation of the turbine wheel assembly 220. The root 234 is configured to engage with the dovetail rim 230 of the disc 224.

In the illustrative embodiment, the dovetail rim 230 forms a dovetail cross-sectional shape when viewed in the circumferential direction looking around the central axis 22. The root 234 of the turbine blade 226 defines a dovetail-receiver channel 236 extending circumferentially through the root 234. The dovetail-receiver channel 236 receives the dovetail rim 230 such that the dovetail rim 230 of the disc 224 and the root 234 of the turbine blade 226 provide a blade mount 238 that couples the turbine blade 226 to the disc 224.

In the illustrative embodiment, the disc 224 further includes a gap 253 as shown in FIG. 6. The gap 253 extends partway around an outer diameter of the central hub 28 about the central axis 22. The gap 253 is configured to allow the root 234 of the turbine blade 226 to be loaded onto the dovetail rim 230 of the disc 224 to provide the blade mount 238. In some embodiments, the disc 224 will include one or more gaps 253 spaced equally around the circumference of the disc 224 about the central axis 22. The equal spacing of the gaps 253 around the circumference of the disc 224 encourages balancing of the disc 224 when the turbine wheel assembly 220 rotates about the central axis 22.

In the illustrative embodiment, the disc 224 further includes a web section 254 as shown in FIGS. 5 and 6. The web section 254 is arranged to extend between and interconnect the dovetail rim 230 and the central hub 228.

In the illustrative embodiment, the turbine blade 226 further includes a platform 256 as shown in FIGS. 5 and 6. The platform 256 may be formed integrally with the airfoil 232. The platform 256 extends circumferentially from the airfoil 232 to block hot gasses interacting with a radially outer portion of the airfoil 232 from moving radially-inward toward the disc 224. In some embodiments, the platform 256 may be an offloaded platform.

In some embodiments, the blade mount 238 further includes an isolation layer 257. The isolation layer 257 is located at the interface of the root 234 and the dovetail rim 230. The isolation layer 257 is configured to resist chemical interaction between the ceramic matrix composite materials of the turbine blade 226 and the metallic materials of the disc 224.

In some embodiments, the isolation layer 257 has a compliance greater than the root 234 of the turbine blade 226 and the dovetail rim 230 of the disc 224 so as to provide a compliant layer there between. The compliant layer is configured to compress and spread contact loads between the root 234 and the dovetail rim 230 when the root 234 engages with the dovetail rim 230 of the disc 224. The spreading of the contact loads between the root 34 and the dovetail rim 30 avoids point contacts and associated stress concentrations in the blade mount 238.

Figures 7, 8:
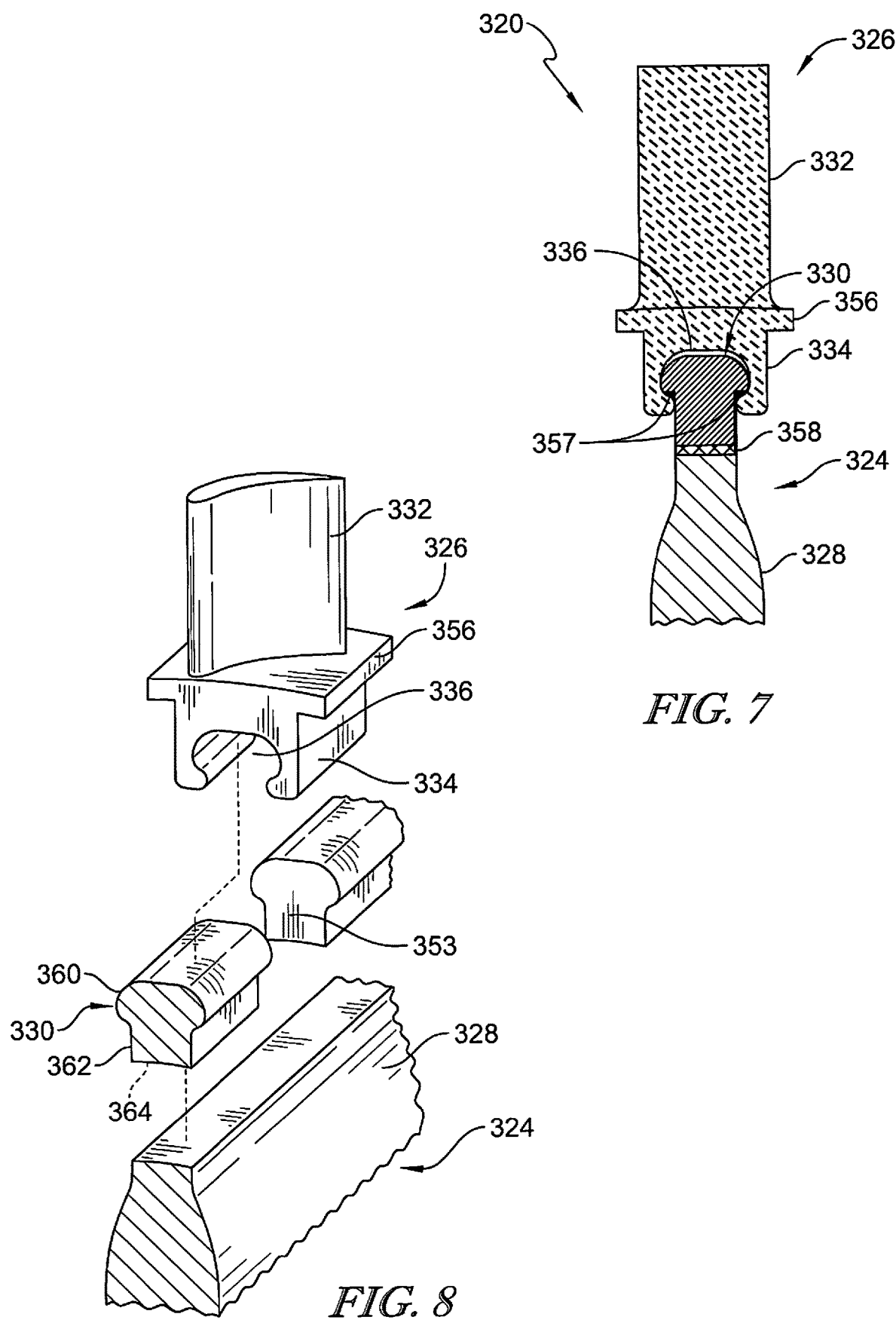
FIG. 7 is a cross-sectional detail view of a third turbine wheel assembly showing that the turbine wheel assembly includes a dovetail rim included in the disc and a root included in the turbine blade and configured to receive the dovetail rim of the disc.
FIG. 8 is an exploded perspective view of the turbine wheel assembly of FIG. 7 showing that the dovetail rim of the disc is formed separately from a central hub of the disc.

A third turbine wheel assembly 320 adapted to be included in the turbine section 18 of the engine 10 is shown in FIGS. 7 and 8. The turbine wheel assembly 320 is designed to rotate about a central axis 22, upon interaction with expanding combustion products from the combustor 16. The turbine wheel assembly 320 includes a disc 324 and a turbine blade 326. The disc 324 is made of metallic materials and is arranged around the central axis 22. The turbine blade 326 is made of ceramic matrix composite materials.

The disc 324 includes a central hub 328 and a dovetail rim 330 as shown in FIGS. 7 and 8. The dovetail rim 330 extends most of the way around an outer diameter of the central hub 328 about the central axis 22.

The turbine blade 326 is shaped to include an airfoil 332 and a root 334 as shown in FIGS. 7 and 8. The airfoil 332 is aerodynamically shaped to interact with expanding gas in combustion products to drive rotation of the turbine wheel assembly 320. The root 334 is configured to engage with the dovetail rim 330 of the disc 324.

In the illustrative embodiment, the dovetail rim 330 forms a dovetail cross-sectional shape when viewed in the circumferential direction looking around the central axis 22. The root 334 of the turbine blade 326 defines a dovetail-receiver channel 336 extending circumferentially through the root 334. The dovetail-receiver channel 336 receives the dovetail rim 330 such that the dovetail rim 330 of the disc 324 and the root 334 of the turbine blade 326 provide a blade mount 338 that couples the turbine blade 326 to the disc 324.

In the illustrative embodiment, the disc 324 further includes a gap 353 as shown in FIG. 8. The gap 353 extends partway around an outer diameter of the central hub 328 about the central axis 22. The gap 353 is configured to allow the root 334 of the turbine blade 326 to be loaded onto the dovetail rim 330 of the disc 324 to provide the blade mount 338. In some embodiments, the disc 324 will include one or more gaps 353 spaced equally around the circumference of the disc 324 about the central axis 22. The equal spacing of the gaps 353 around the circumference of the disc 324 encourages balancing of the disc 324 when the turbine wheel assembly 320 rotates about the central axis 22.

In the illustrative embodiment, the dovetail rim 330 of the disc is formed separately from the central hub 328 and bonded to the disc 324 with a brazing layer 358 as shown in FIGS. 7 and 8. The brazing layer 358 could be either a diffusion bond or a diffusion braze to attach the dovetail rim 330 to the central hub 228.

In some embodiments, the dovetail rim 330 could be formed in a single ring. The central hub 328 could also be formed as a single piece. The method of attaching the dovetail rim 330 to the central hub 328 could include freezing the central hub 328 while heating the dovetail rim 330 before bonding the dovetail rim 330 to the central hub 328. The process of freezing and heating the separate pieces creates a slight interference fit between the central hub 328 and the dovetail rim 330 prior to bonding the dovetail rim 330 to the central hub 328. After the dovetail rim 330 is bonded to the central hub 328, the assembly may be machined. In some embodiments, the dovetail rim 330 could be formed from multiple segments which would each be bonded to the central hub 328 individually.

The dovetail rim 330 of the disc 324 comprises a first metallic material having a first coefficient of thermal expansion and the central hub 328 of the disc 324 comprises a second metallic material have a second coefficient of thermal expansion that is different than the first coefficient of thermal expansion of the first metallic material. The first metallic material of the dovetail rim 330 has a higher temperature capability than the second metallic material of the central hub 328 of the disc.

The dovetail rim 330 of the disc 324 includes a dovetail rim head 360, a neck 362, and a base surface 364. The neck 362 extends radially inward and down from the dovetail rim head 360. The base surface 364 is located on the radially-inward most side of the neck 362 and is configured to be bonded to the central hub 328 of the disc 324 with the brazing layer 358.

In the illustrative embodiment, the turbine blade 326 further includes a platform 356 as shown in FIGS. 7 and 8. The platform 356 may be formed integrally with the airfoil 332. The platform 356 extends circumferentially from the airfoil 332 to block hot gasses interacting with a radially outer portion of the airfoil 332 from moving radially-inward toward the disc 324. In some embodiments, the platform 356 may be an offloaded platform.

In some embodiments, the blade mount 338 further includes an isolation layer 357. The isolation layer 357 is located at the interface of the root 334 and the dovetail rim 330. The isolation layer 357 is configured to resist chemical interaction between the ceramic matrix composite materials of the turbine blade 326 and the metallic materials of the disc 324.

In some embodiments, the isolation layer 357 has a compliance greater than the root 334 of the turbine blade 326 and the dovetail rim 330 of the disc 324 so as to provide a compliant layer there between. The compliant layer is configured to compress and spread contact loads between the root 334 and the dovetail rim 330 when the root 334 engages with the dovetail rim 330 of the disc 324. The spreading of the contact loads between the root 34 and the dovetail rim 30 avoids point contacts and associated stress concentrations in the blade mount 338.

A fourth turbine wheel assembly 420 adapted to be included in the turbine section 18 of the engine 10 is shown in FIGS. 9-12. The turbine wheel assembly 420 is designed to rotate about a central axis 22, upon interaction with expanding combustion products from the combustor 16. The turbine wheel assembly 420 includes a disc 424 and a turbine blade 426. The disc 424 is made of metallic materials and is arranged around the central axis 22. The turbine blade 426 is made of ceramic matrix composite materials.

The disc 424 includes a central hub 428 and a dovetail rim 430 as shown in FIGS. 9-12. The dovetail rim 430 extends most of the way around an outer diameter of the central hub 428 about the central axis 22.

The turbine blade 426 is shaped to include an airfoil 432 and a root 434 as shown in FIGS. 9 and 12. The airfoil 432 is aerodynamically shaped to interact with expanding gas in combustion products to drive rotation of the turbine wheel assembly 420. The root 434 is configured to engage with the dovetail rim 430 of the disc 424.

The dovetail rim 430 forms a dovetail cross-sectional shape when viewed in the circumferential direction looking around the central axis 22. The root 434 of the airfoil 432 defines a dovetail-receiver channel 436 extending circumferentially through the root 434. The dovetail-receiver channel 436 receives the dovetail rim 30 such that the dovetail rim 430 of the disc 424 and the root 434 of the turbine blade 426 provide a blade mount 438 that couples the turbine blade 426 to the disc 424.

The blade mount 438 further includes a clamp assembly 440 as shown in FIGS. 9-12. The clamp assembly 440 is configured to apply axial clamp load onto the root 434 of the turbine blade 426.

The clamp assembly 440 includes a forward keeper ring 442 and an aft keeper ring 444 as shown in FIGS. 9 and 12. The forward keeper ring 442 is located on a forward side of the disc 424 and the aft keeper ring located an aft side of the disc 424. Each of the forward and aft keeper rings 442, 444 are shaped to provide a root interface portion 446 and a disc interface portion 448 as shown in FIG. 12. The root interface portion 446 is configured to engage and apply axial clamp load onto the root 434 of the turbine blade 426. The disc interface portion 448 is configured to engage and apply axially clamp load onto the disc 424.

The clamp assembly 440 further includes a fastener 452 as shown in FIGS. 10-12. The fastener 452 is configured to couple the disc interface portions 448 of the forward and aft keeper rings 442, 444 to the disc 424. In some embodiments, the fastener 452 could be a bayonet fitting that could be disengaged and engaged as shown in FIGS. 10 and 11. The fastener 452 is disengaged before rotating the forward and aft keeper rings 442, 444 about the central axis 11 to rotate the disc interface portion 448 as suggested by arrow 456 in FIG. 10. The fastener 452 is engaged once the forward and aft keeper rings 442, 444 have been rotated about the central axis 11 to rotate the disc interface portion 448 and engage the disc interface portion 448 with the web section 454 as suggested by the arrow 458 in FIG. 11.

In the illustrative embodiment, each of the forward and aft keeper rings 442, 444 include a middle portion 450 as shown in FIG. 12. The middle portion 450 extends between and interconnects the root interface portion 446 and the disc interface portion 448. The middle portion 450 interfaces both the root 434 and the disc 424.

In the illustrative embodiment, the disc further includes a gap 453 as shown in FIG. 6. The gap 453 extends partway around an outer diameter of the central hub 428 about the central axis 22. The gap 453 is configured to allow the root 434 of the turbine blade 426 to be loaded onto the dovetail rim 430 of the disc 424 to provide the blade mount 438. In some embodiments, the disc 424 will include one or more gaps 453 spaced equally around the circumference of the disc 424 about the central axis 22. The equal spacing of the gaps 453 around the circumference of the disc 424 encourages balancing of the disc 424 when the turbine wheel assembly 420 rotates about the central axis 22.

In the illustrative embodiment, the disc 424 further includes a web section 454. The web section 454 is arranged to extend between and interconnect the dovetail rim 430 and the central hub 428. The disc interface portions 448 of each of the forward and aft keeper rings 442, 444 are configured to apply a clamp load onto the web section 454 of the disc 424.

In some embodiments, the turbine blade 426 further includes a platform. The platform may be formed integrally with the airfoil 432. The platform extends circumferentially from the airfoil 432 to block hot gasses interacting with a radially outer portion of the airfoil 432 form moving radially-inward toward the disc 424.

In some embodiments, the platform may be an offloaded platform. In other embodiments, the forward keeper ring 442 could be shaped to include a forward platform portion while the aft keeper ring 444 could be shaped to include an aft platform portions. The forward and aft platform portions extend circumferentially from the forward and aft keeper rings 442, 444 to block hot gasses interacting with a radially outer portion of the turbine blade 426 from moving radially-inward toward the disc 424.

Figure 13:
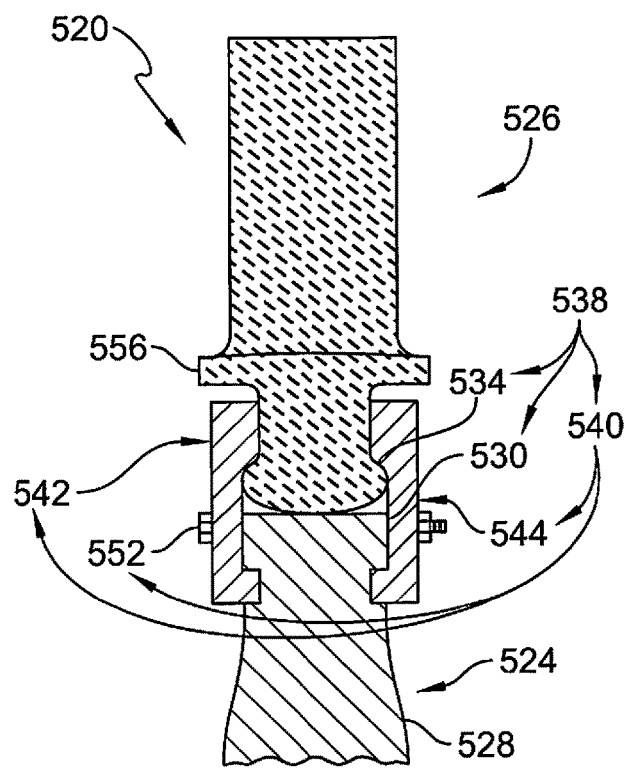
FIG. 13 is a cross-sectional detail view of a fifth turbine wheel assembly showing that the turbine wheel assembly includes a dovetail rim included in the disc, a root included in the turbine blade and configured to receive the dovetail rim of the disc, and a clamp assembly configured to apply axial clamp load onto the root of the turbine blade to maintain the root of the turbine blade on the dovetail rim of the disc.
Figure 14:
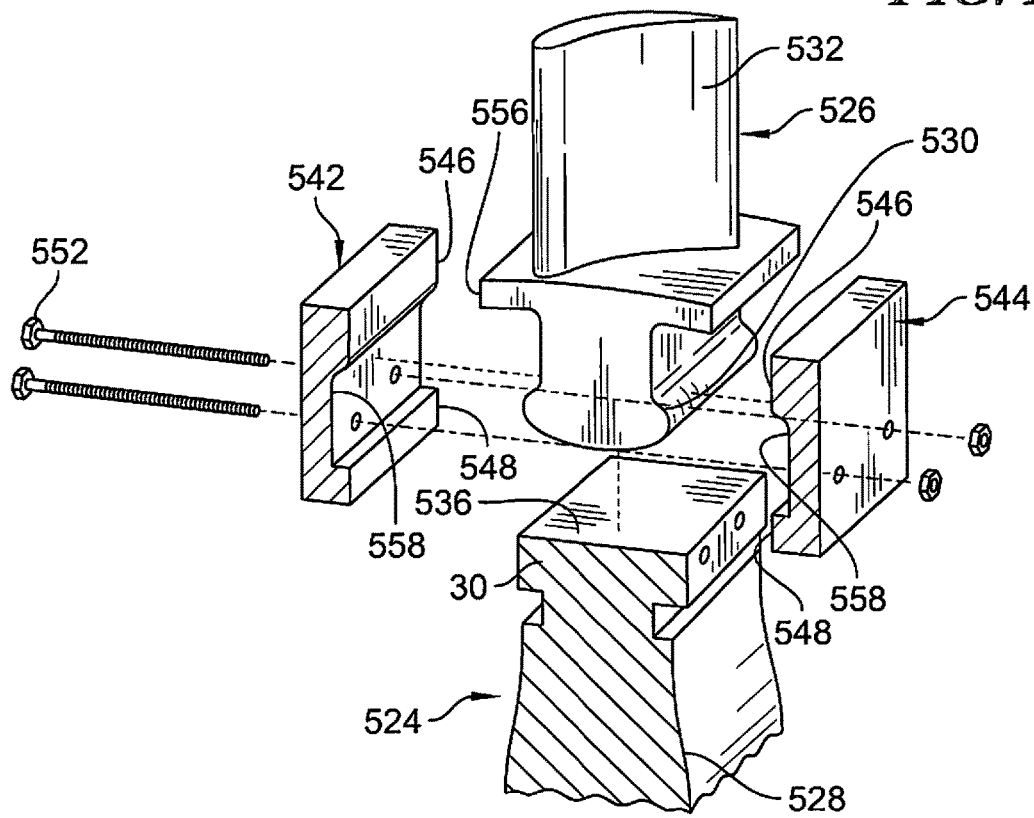
FIG. 14 is an exploded perspective view of the turbine wheel assembly of FIG. 13 showing that the turbine wheel assembly includes a disc, a turbine blade, and a blade mount.

A fifth turbine wheel assembly 520 adapted to be included in the turbine section 18 of the engine 10 is shown in FIGS. 13 and 14. The turbine wheel assembly 20 is designed to rotate about a central axis 22, upon interaction with expanding combustion products from the combustor 16. The turbine wheel assembly 520 includes a disc 524 and a turbine blade 526. The disc 524 is made of metallic materials and is arranged around the central axis 22. The turbine blade 526 is made of ceramic matrix composite materials.

The disc 524 includes a central hub 528 and a rim 530 as shown in FIGS. 13 and 14. The rim 530 extends radially outward around the central axis 22.

The turbine blade 526 is shaped to include an airfoil 532 and a root 534 as shown in FIGS. 13 and 14. The root 534 is configured to engage with the rim 530 of the disc 524.

In the illustrative embodiments, the root 534 of the turbine blade 326 forms a dovetail cross-sectional shape when viewed in the circumferential direction looking around the central axis 22. The rim 530 of the disc 524 defines a dovetail-receiver channel 536 extending circumferentially through the rim 530. The rim 530 receives the root 534 such that the rim 530 of the disc 524 and the root 534 of the turbine blade 526 provide a blade mount 538 that couples the turbine blade 526 to the disc 524.

The blade mount 538 further includes a clamp assembly 540 as shown in FIGS. 13 and 43. The clamp assembly 540 is configured to apply axial clamp load onto the root 534 of the turbine blade 526.

The clamp assembly 540 includes a forward keeper ring 542 and an aft keeper ring 544 as shown in FIGS. 13 and 14. The forward keeper ring 542 is located on a forward side of the disc 524 and the aft keeper ring 544 is located an aft side of the disc 524. Each of the forward and aft keeper rings 542, 544 are shaped to provide a root interface portion 546 and a disc interface portion 548. The root interface portion 546 is configured to engage and apply axial clamp load onto the root 534 of the turbine blade 526. The disc interface portion 548 is configured to engage and apply axially clamp load onto the disc 524.

The clamp assembly 540 further includes a fastener 552. The fastener 552 is configured to couple the disc interface portions 548 of the forward and aft keeper rings 542, 544 to the disc 524.

In the illustrative embodiment, the fastener 552 extends through the disc interface portions 448 of the forward and aft keeper rings 542, 544 and the disc 524 to couple the disc interface portions 548 of the forward and aft keeper rings 542, 544 to the disc 524 so that the disc interface portions 548 apply axially clamp load to the disc 524.

In the illustrative embodiment, each of the forward and aft keeper rings 542, 544 are further shaped to provide a root receiving channel 558 as shown in FIGS. 13 and 14. The root receiving channel 558 is configured to receive the root 534 of the turbine blade 526 when the forward and aft keeper rings 542, 544 engage and apply axial clamp load onto the root 534 of the turbine blade 526.

In some embodiments, the turbine blade 526 further includes a platform 556. The platform 556 may be formed integrally with the airfoil 432. The platform 556 extends circumferentially from the airfoil 532 to block hot gasses interacting with a radially outer portion of the airfoil 532 form moving radially-inward toward the disc 524.

In some embodiments, the platform 556 may be an offloaded platform. In other embodiments, the forward keeper ring 542 could be shaped to include a forward platform portion while the aft keeper ring 544 could be shaped to include an aft platform portions. The forward and aft platform portions extend circumferentially from the forward and aft keeper rings 542, 544 to block hot gasses interacting with a radially outer portion of the turbine blade 526 from moving radially-inward toward the disc 524.

The turbine wheel assemblies 20, 220, 320, 420, 520 disclosed in this application may address the challenge of attaching a ceramic matrix composite blade 26, 226, 326, 426, 526 to a corresponding disc 24, 224, 324, 424, 524. The minimum thickness of the disc is a key challenge. Some approaches including axial extending dovetail attachment result in insufficient disc cross-sectional area to transmit the radial loading. Incorporating a reverse or circumferentially-extending dovetail feature at the blade and disc connection interface can increase the size of the disc's minimum thickness such that the stresses are within acceptable limits. The metallic dovetail of the disc could be incorporated by either being an integral part of the disc, a discontinuous dovetail, or a separate retention post joined to the disc.

Any further increase in circumferential space claim per blade can result in an infeasible reduction in the number of blades. Therefore there is a fundamental limit that can affect the current ceramic matrix composite blade attachment methods to metallic discs.

An increase in space claim for a circumferential retention system, like the present disclosure describes, can results in an increase in the axial size of the disc, which is feasible. Therefore, the present disclosure can be scaled to manage stress to an acceptable limit. Further, the ceramic matrix composite reverse dovetail feature could be machined or formed with two-dimensional or three-dimensional layups.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine wheel assembly adapted for rotation about a central axis, the assembly comprising
a disc made of metallic materials arranged around the central axis, the disc including a central hub, a dovetail rim that extends partway around the central axis, and a web section arranged to extend between and interconnect the dovetail rim and the central hub, a turbine blade made of ceramic matrix composite materials, the turbine blade shaped to include an airfoil and a root configured to engage with the dovetail rim of the disc, wherein the dovetail rim forms a dovetail cross-sectional shape when viewed in the circumferential direction looking around the central axis and the root of the turbine blade defines a dovetail-receiver channel extending circumferentially through the root that receives the dovetail rim such that the dovetail rim of the disc and the root of the turbine blade provide a blade mount that couples the turbine blade to the disc, wherein the blade mount further includes a clamp assembly configured to apply axial clamp load onto the root of the turbine blade, the clamp assembly including a forward keeper ring arranged along an axially forward side of the disc and an aft keeper ring arranged along an axially aft side of the disc, wherein each of the forward and aft keeper rings is shaped to provide a root interface portion configured to engage and apply axial clamp load onto the root of the turbine blade, a disc interface portion configured to engage and appy axially clamp load onto the disc, and a middle portion that extends radially between and interconnects the root interface portion and the disc interface portion, and wherein the disc interface portion extends axially from the middle portion toward the disc and engages the web section of the disc to form a bayonet fitting between the corresponding keeper ring and the disc configured to couple the disc interface portion of the corresponding keeper ring to the disc.

2. The assembly of claim 1, wherein the dovetail rim of the disc is formed separately from the central hub and includes a dovetail rim head, a neck extending radially inward and down from the dovetail rim head, and a base surface located on the radially-inward most side of the neck and configured to be bonded to the disc with a brazing layer.

3. The assembly of claim 2, wherein the dovetail rim of the disc comprises a first metallic material and the central hub of the disc comprises a second metallic material, the first metallic material having a higher temperature capability than the second metallic material of the central hub of the disc.

4. The assembly of claim 1, wherein the disc interface portion of each of the forward and aft keeper rings is configured to apply a clamp load onto the web section of the disc through the bayonet fitting.

5. The assembly of claim 4, wherein the turbine blade further includes a platform formed integrally with the airfoil and extending circumferentially from the airfoil to block hot gasses interacting with a radially outer portion of the airfoil from moving radially-inward toward the disc.

6. The assembly of claim 5, wherein the blade mount further includes an isolation layer boated between the root and the dovetail rim and configured to resist chemical interaction between the ceramic matrix composite materials of the turbine blade and the metallic materials of the disc.

7. The assembly of claim 6, wherein the isolation layer has a compliance greater than the root of the turbine blade and the dovetail rim of the disc so as to provide a compliant layer therebetween.

8. The assembly of claim 1, wherein the web section of the disc is shaped to define tabs that extend axially away from the central hub to define a channel that opens radially inwardly and is sized to receive the disc interface portions.

9. The assembly of claim 8, wherein each disc interface portion of the forward and aft keeper rings is shaped to define tabs that extend radially outward into the channel defined by the web section of the disc and engage the tabs of the web section to form the bayonet fitting.

10. The assembly of claim 9, wherein each disc interface portion of the forward and aft keeper rings includes an axially-extending portion that extends axially from the middle portion and a radially-extending portion that extends radially outward from the axially-extending portion at a location spaced apart from the middle portion to define a channel that opens radially outwardly and is sized to receive a portion of the web section, the radially-extending portion shaped to define the tabs of the disc interface portion.

11. The assembly of claim 10, wherein the web section of the disc includes an axially-extending portion that extends axially away from the central hub and a radially-extending portion that extends radially inward into the channel defined by the web section of the disc, the radially-extending portion shaped to define the tabs of the disc interface portion.

12. A turbine wheel assembly adapted for rotation about a central axis, the assembly comprising a disc made of metallic materials arranged around the central axis, the disc including a central hub, a rim that extends around the central axis, and a web section arranged to extend between and interconnect the central hub and the rim, a turbine blade made of ceramic matrix composite materials, the turbine blade shaped to include an airfoil and a root configured to engage with the rim of the disc, wherein the root of the turbine blade forms a dovetail cross-sectional shape when viewed in the circumferential direction looking around the central axis and the rim of the disc defines a dovetail-receiver channel extending circumferentially through the rim that receives the root such that the rim of the disc and the root of the turbine blade provide a blade mount that couples the turbine blade to the disc wherein the blade mount further includes a clamp assembly configured to apply axial clamp load onto the root of the turbine blade, wherein the clamp assembly includes a forward keeper ring arranged along an axially forward side of the disc and an aft keeper ring arranged along an axially aft side of the disc, each of the forward and aft keeper rings shaped to provide a root interface portion that extends radially relative to the axis and is configured to engage and apply axial clamp load onto the root of the turbine blade and a disc interface portion that extends axially from the root interface portion toward the disc and is configured to engage and apply axially clamp load onto the disc, and wherein the disc interface portion engages the web section of the disc to form a bayonet fitting between the corresponding keeper ring and the disc to couple the disc interface portion of the corresponding keeper ring to the disc.

13. The assembly of claim 12, wherein each of the forward and aft keeper rings are further shaped to provide a root receiving channel configured to receive the root of the turbine blade when the forward and aft keeper rings engage and apply an axial clamp load onto the root of the turbine blade.

14. The assembly of claim 12, wherein the web section of the disc is shaped to define tabs that extend axially away from the central hub to define a channel that opens radially inwardly and is sized to receive the disc interface portions.

15. The assembly of claim 14, wherein each disc interface portion of the forward and aft keeper rings is shaped to define tabs that extend radially outward into the channel defined by the web section of the disc and engage the tabs of the web section to form the bayonet fitting.

16. The assembly of claim 15, wherein each disc interface portion of the forward and aft keeper rings includes an axially-extending portion that extends axially from the middle portion and a radially-extending portion that extends radially outward from the axially-extending portion at a location spaced apart from the middle portion to define a channel that opens radially outwardly and is sized to receive a portion of the web section, the radially-extending portion shaped to define the tabs of the disc interface portion.

17. The assembly of claim 16, wherein the web section of the disc includes an axially-extending portion that extends axially away from the central hub and a radially-extending portion that extends radially inward into the channel defined by the web section of the disc, the radially-extending portion shaped to define the tabs of the disc interface portion.

* * * * *